United States Patent [19]
Cabral

[11] Patent Number: 5,361,741
[45] Date of Patent: Nov. 8, 1994

[54] ELECTRONIC IGNITION DEVICE FOR INTERNAL COMBUSTION ENGINES

[76] Inventor: Duarte M. Cabral, 19553 SW. Lisa Ct., Aloha, Oreg. 97006-1912

[21] Appl. No.: 62,235

[22] Filed: May 17, 1993

[51] Int. Cl.⁵ .............................................. F02P 5/00
[52] U.S. Cl. .................................... 123/427; 123/418
[58] Field of Search ............... 123/427, 418, 425, 662, 123/424, 478, 651

[56] References Cited

U.S. PATENT DOCUMENTS

| | | | |
|---|---|---|---|
| 4,282,841 | 8/1981 | Takagi et al. | 123/425 |
| 4,426,975 | 1/1984 | Suzuki et al. | 123/425 |
| 4,444,171 | 4/1984 | Baxter | 123/418 |
| 4,577,609 | 3/1986 | Donohue | 123/602 |
| 4,592,324 | 6/1986 | Nakano et al. | 123/424 |
| 4,646,698 | 3/1987 | Inoue et al. | 123/478 |
| 4,651,706 | 3/1987 | Yukawa et al. | 123/651 |

Primary Examiner—Raymond A. Nelli

[57] ABSTRACT

An electronic ignition device for internal combustion engines is disclosed. The disclosed device employs a Hall sensor along with a Permanent Magnet (PM) mounted on a moving part of an engine to establish a reference point from which an Advance Firing Angle (AFA) is calculated and applied to the firing of a spark plug. The signal generated by the PM passing the active area of the Hall sensor is called the Master Reference Signal (MRS). The invention senses the speed of the engine and based on the speed of the engine sets an AFA for the firing of the spark plug from the set reference point. As the speed of the engine changes the AFA at the which the spark plug fires at is also changed by the invention. The invention also has a Regulated Supply Voltage Booster that boosts the supply voltage to a higher voltage for charging a capacitor that is used in capacitive discharge firing of a spark plug. This device also contains a means for the user of the invention to change the AFA of the firing of a spark plug while the invention and engine is running so that maximum performance of the engine may be obtained under different engine load conditions.

18 Claims, 3 Drawing Sheets

ELECTRONIC IGNITION DEVICE FOR INTERNAL COMBUSTION ENGINES

BACKGROUND OF THE INVENTION

1. Field of the Invention

This invention relates to a device electronic in nature with no moving parts that accomplishes the ignition of a fuel air mixture in an internal combustion engine, and in particular to a device that determines the correct time to fire the fuel air mixture so that a predetermined and set advance firing angle (AFA) may be applied to the firing of a spark plug which is dependent on the speed of the engine. The correct time for firing the spark plug at the desired AFA as well as the determination of the speed of the engine is determined with each firing cycle of the cylinder and this information is used on the next firing cycle of the cylinder. The invention accomplishes the above with the use of hardware that is solely dedicated to performing the above tasks as opposed to units that use a microprocessor and associated software.

2. Prior Art

Ignition devices for the firing of a spark plug in an internal combustion engine are well know in prior art and are widely used. This invention seeks to provide a device which has a regulated spark plug firing voltage which is independent of the speed of the engine so as to improve the reliability of the firing of the spark plug. This invention seeks to improve the speed pick up or acceleration of an internal combustion engine that utilizes electronic ignition devices that utilize speed averaging techniques for the determining of the speed of the engine and for the setting of the AFA at which the spark plug is fired. The improvement is accomplished by determining the speed of the engine and the AFA to be applied to the firing of the spark plug with each fuel air compression stroke of the cylinder, and applying this to the next firing cycle of the cylinder. This thus affords a much faster speed pick up of an engine.

This invention seeks to provide an improvement over ignition devices that use a mechanical means of changing the AFA at which the spark plug is fired. A mechanical means of changing the AFA of the spark plug firing normally means moving a sensor such as a Hall sensor with relationship to a moving permanent magnet (PM) which is normally mounted to the rotating shaft of an engine. Movement of the sensor is typically done by mechanically coupling it to the throttle of the engine. Having a device such as this invention that has a single nonmoving sensor such as a Hall sensor for the sensing of a passing reference point in the engine's firing cycle means a greater ease of installation and reliability as there are no moving parts which may wear out or break. A further advantage of this invention is that it allows the user of the invention to change the AFA at which the spark plug is fired while the engine is running at full throttle or above a reference speed called the idle Threshold Speed (ITS) of the engine by the adjusting of a potentiometer. The AFA of the spark plug is set to 0 degrees below the ITS and it is independent of the above said potentiometer. This allows for a much smoother idle of the engine. With an ignition device that uses a mechanical means of changing the AFA of the spark plug, changes that are made to the AFA of the spark plug firing at the full throttle setting of the engine have a high probability of also affecting the AFA of the spark plug firing at the low throttle position of the engine as well. If the same AFA firing of the spark plug is to be maintained at the low throttle setting when the high throttle setting of the AFA of the spark plug firing has been changed, then fundamental changes to the movement of the Hall sensor will have to be made which may prove difficult.

A further advantage of this invention over that of an ignition device that has an AFA that is mechanically controlled is that it ensures that the AFA firing of the spark plug will not be advanced too rapidly or by not too much for the given current speed of the engine as the AFA applied to the firing of the spark plug is dependent on the speed of the engine. Rapid advances of AFA to the firing of the spark plug can cause too early a firing of the fuel air mixture and this can cause the engine speed to be slowed and in severe cases it can cause the engine to be stopped as well as cause excessive vibration of the engine to occur.

Furthermore this invention seeks to provide a greater safety aspect for the user of internal combustion engines that are going to be hand started, such as those engines employed in chain saw applications or in model aircraft applications. An engine whose AFA firing of the spark plug is controlled by mechanical coupling to the throttle may be started with the AFA firing of the spark plug at greater than 0 degrees of AFA. If during starting of an engine with this type of mechanical AFA control, the user does not put enough energy into rotating the crank shaft of the engine on the fuel air compression stroke of the engine to overcome the additional pressure of the firing fuel air mixture so that the piston goes beyond top dead center of the compression stroke of the engine, the engine will backfire with a strong possibility of hurting the person starting the engine. This is especially true of engines that are employed in model aircraft applications as the user is probably hand flipping the propeller and a backfire may hurt the user's hand, and in severe cases may cut it and or remove it. The propeller may even come off as often does happen and strike the user or bystanders.

Furthermore this invention seeks to provide an advantage over ignition units for internal combustion engines that are computer controlled through software. The advantages are that this invention causes less electromagnetic radiation to be emitted thus resulting in less radio interference which is desirable in the operation of radio control model aircraft. Less electromagnetic radiation emissions is a result of having the circuit elements of the invention transition once per compression stroke of the fuel air mixture of the cylinder whereas computer controlled ignition units have internal signals changing many times per compression stroke of the fuel air mixture of the cylinder. A further advantage of having a dedicated piece of electrical hardware to control the AFA firing of the spark plug is that it will be able to perform this function much faster than a software controlled ignition unit and with a greater AFA accuracy possible at the higher engine speeds. A further object of this invention is to provide an advantage over those units that are commonly known as 2 fixed sensor or 2 fixed position ignition devices where the AFA applied to the firing of the spark plug is switched between these 2 points. The main advantage of this invention over the just said ignition device is that the top engine speed AFA firing of the spark plug is electronically changeable by mean of a potentiometer as opposed to being fixed. To change the AFA of the firing of a spark plug of a 2 sensor position ignition device one has to mechanically alter the relative position of the high speed AFA sensor. This may prove difficult to do if the engine is running due to safety aspects. Engines normally used in model airplane applications have the sensors placed on the shaft of the engine in close proximity to the propeller therefore making adjustments difficult if the propeller is rotating. Also with a 2 position ignition device there are only 2 set points for the AFA of the firing of the spark plug. The disclosed invention changes the AFA firing of the spark plug depending on the speed of the engine, exact details of how this is accomplished is covered in the detailed description of the invention,

SUMMARY OF THE INVENTION

In accordance with this invention I provide a device which I denote as an electronically controlled ignition device for internal combustion engines. The ignition device senses the relative position of an engine's fuel air compression stroke through the use of a Hall sensor and a PM. The PM is normally placed on the shaft of the engine or other moving part such that the Hall sensor produces a rising edge signal when the piston is in the compression stroke of the fuel air mixture and the piston is at or near the top dead center of the stoke. The user physically positions the Hall sensor such that a rising edge is generated where the user wants the 0 degree AFA firing of the spark plug to occur and this point becomes the reference point from which the invention then advances the firing of the spark plug. The AFA applied to the firing of the spark plug is dependent on the speed of the engine. If the speed of the engine is below a speed called the ITS, then 0 degrees of AFA will be applied to the firing of the spark plug. The user of the invention by use of a potentiometer in the invention may change the AFA at which the spark plug fires while the engine is running if the engine speed is above the ITS.

The device contains a Regulated Supply Voltage Booster that boosts the supply voltage to a higher voltage so as to charge a capacitor to be called a Capacitive Discharge Capacitor (CDC) that is used in the capacitive discharge firing circuit of a spark plug. The invention contains a circuit that senses the voltage present across the CDC and if it is beyond a set threshold voltage it stops further build up of voltage across the CDC. This is advantageous as it provides for a regulated firing voltage of the spark plug.

BRIEF DESCRIPTION OF THE DRAWINGS

These and other features and advantages of the present invention will become more apparent from the following detailed description of exemplary embodiments thereof, as illustrated in the accompanying drawings, in which.

This invention will be more fully understood in conjunction with the following detailed description taken together with the drawings.

DETAILED DESCRIPTION OF THE INVENTION

The following detailed description of this invention is meant to be illustrative only and not limiting. Other embodiments of this invention will be obvious to those skilled in the art in view of the following disclosure. Numerous specific details are set forth, such as circuit configurations, timing diagrams and the like, in order to provide a thorough understanding of the invention. It will be obvious to one skilled in the art that the present invention may be practiced without these specific details. In other instances, well-known circuit details and steps are not described in detail so as not to obscure the invention.

Figure 1:
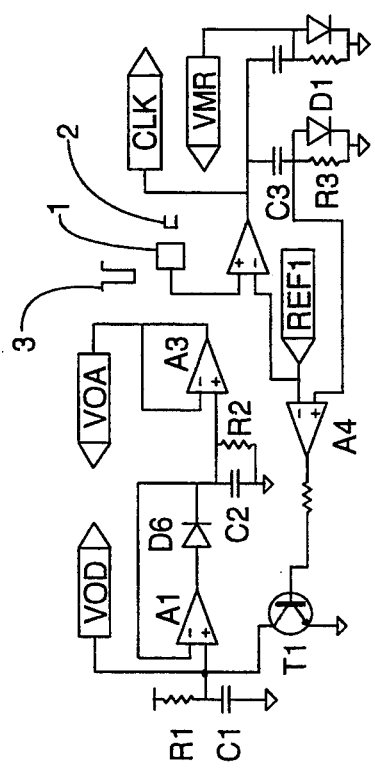
FIG. 1 is a schematic diagram of an exemplary circuit for producing output signals corresponding to the rotational velocity and position of a rotating shaft according to the present invention.
Figure 2:
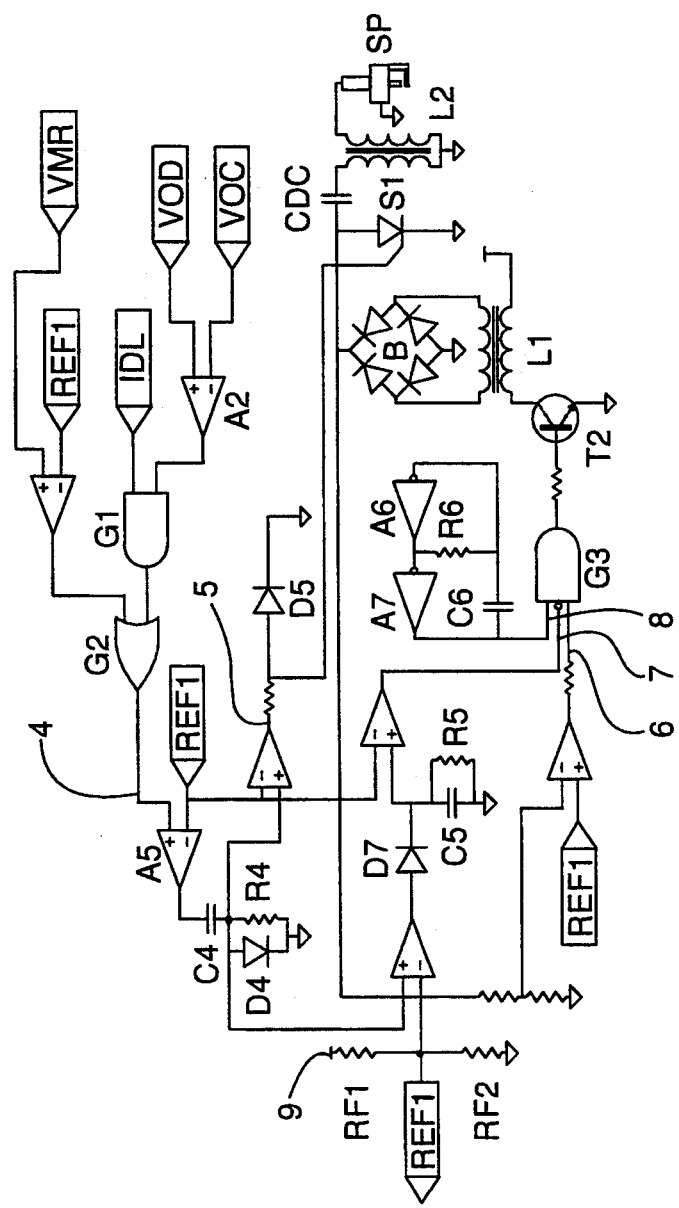
FIG. 2 is a schematic diagram of an exemplary circuit that contains a spark plug firing time calculator and spark plug firing control logic.
Figure 3:
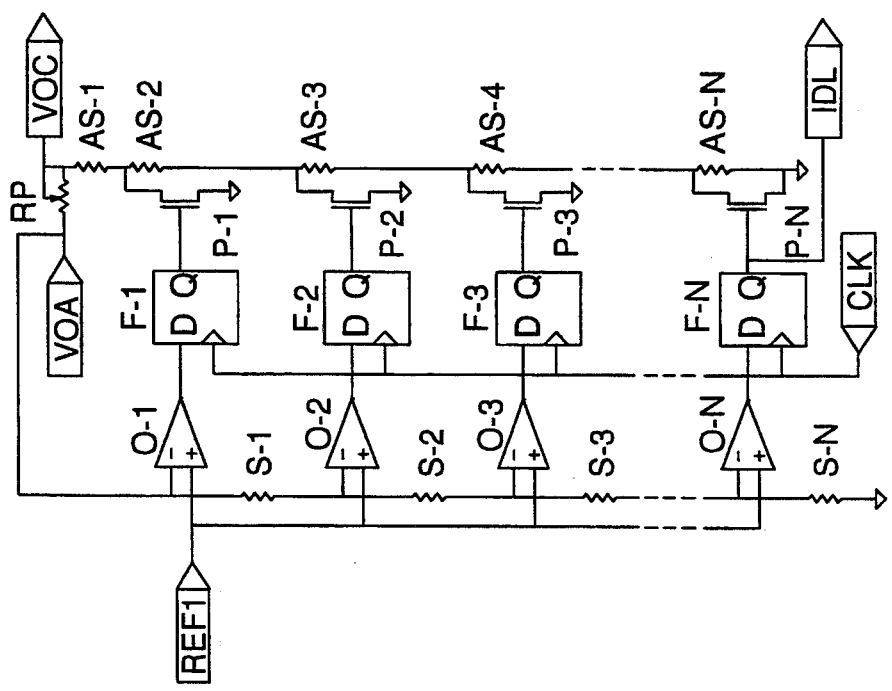
FIG. 3 is a schematic diagram of a variable divider circuit and idle detection circuit.

An embodiment of the invention is contained in FIGS. 1, 2, 3 taken as a whole. Also it should be noted that other figures may replace those listed above and this will be noted where appropriate.

Now referring to FIG. 2:

The reference voltage REF1 is constructed by use of the resistors RF1 and RF2. The top node of a resistor RF1 is connected to the positive power supply terminal as indicated by the symbol. The reference voltage REF1 is constructed such that it is equal to approximately ½ of the power supply voltage or to suit the electrical components that it is acting as a reference to.

Now referring to FIG. 1:

A Hall sensor 1 along with a permanent magnet (PM) 2 acts as a relative position indicator portion of the invention. It produces a down going pulse as referred to by reference numeral 3 every time a PM passes sufficiently close to the active area of the Hall sensor. The PM is positioned on a moving portion of the engine such as a rotating shaft such that the Hall sensor produces a downward going voltage pulse every time the PM passes the active area of the Hall sensor.

The signal output from the Hall sensor is called the Master Reference Signal (MRS), it is buffered and called CLK. The beginning and end of the invention's timing cycle is marked by the rising edge of the MRS which causes the capacitor C1 to be discharged to ground potential, how this is achieved is explained later. Just prior to the discharge of capacitor C1, C1 has reached its maximum voltage for the current period of the MRS, and this maximum voltage attained is dependent entirely on the length of the period of the MRS.

The component values chosen for use in the Main Timing Element (MTE) which is composed of circuit elements resistor R1 and capacitor C1 is dependent on the period of the MRS. The shorter the period of the MRS the lower the voltage which capacitor C1 attains at any point in time for any set of component values that make up the MTE. A higher VOD signal voltage value may be obtained at any point in the timing cycle if the value of capacitor C1 is lowered, or if the value of resistor R1 is lowered, or both. A higher voltage rise time of VOD may be desired if the period of the MRS is such that the voltage which signal VOD attains is not sufficient for proper operation of the electrical components that it supplies a signal to.

The voltage across capacitor C1 is buffered by operational amplifier A1. Operational amplifier A1 can only place charge onto the capacitor C2 to be called the Sample Voltage Capacitor (SVC) through the diode D6. Charge is removed from the SVC by use of a resistor R2 to be called the Sample Bleed Resistor (SBR) which is connected in parallel across the SVC. The SVC then tends to act as a storage element for the maximum voltage that was achieved by capacitor C1 during the period of the MRS. The time constant created by the SVC C2 and the SBR R2 is much longer than that of the period of the MRS.

Figure 5:
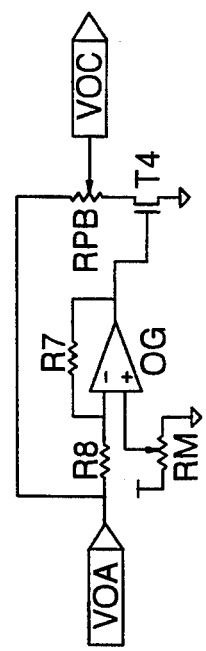
FIG. 5 is an alternative variable divider circuit to that shown in FIG. 3.

For long periods of the MRS the values of AFA that the circuits of FIGS. 3 or 5 generates will have to be adjusted downwards to take into account the voltage drop in the SVC C2 due to the SBR R2 which causes a higher AFA firing of the spark plug to take place. The lowering of the value of the SBR will increase the responsiveness of the VOA signal to rapid decreases in the period of the MRS. The circuits involved in the placing and holding of a voltage on the SVC is called a Sample and Hold Circuit.

The rising edge of the MRS causes a positive voltage pulse to be generated at the noninverting input of voltage comparator A4 and at the signal port of VMR. Circuit elements capacitor C3, resistor R3 and diode D1 are configured as shown and is called in this invention an Edge to Pulse Conversion Circuit of positive edge sensitivity. The purpose of diode D1 is to ensure that negative under shoot voltages below ground potential are shorted to ground potential so as not to damage the inputs of other circuit elements in the invention.

The duration of the positive pulse that goes to the noninverting input of the voltage comparator A4 is dependent on the values of capacitor C3 and resistor R3. Similarly the positive voltage pulse which makes up the signal VMR is also constructed.

When the output of operational amplifier A4 goes to maximum voltage it causes the transistor T1 to be turned on and this causes the capacitor C1 to be discharged. Transistor T1 should be on long enough only to allow the full discharge of the capacitor C1. With this circuit configuration the beginning and end of the period of the MRS is marked by successive discharges of the capacitor C1 which is marked by the rising edge of the MRS. The circuit elements and configuration which causes the discharge of capacitor C1 to take place when the rising edge of the MRS occurs is to be called the Cyclic Discharge Circuit of this circuit configuration. The value of the voltage present across the SVC C2 is a direct function of the period of the MRS. The circuit elements and configuration employed in the generation of the voltage across the SVC is called the Period Determination Circuit.

Figure 4:
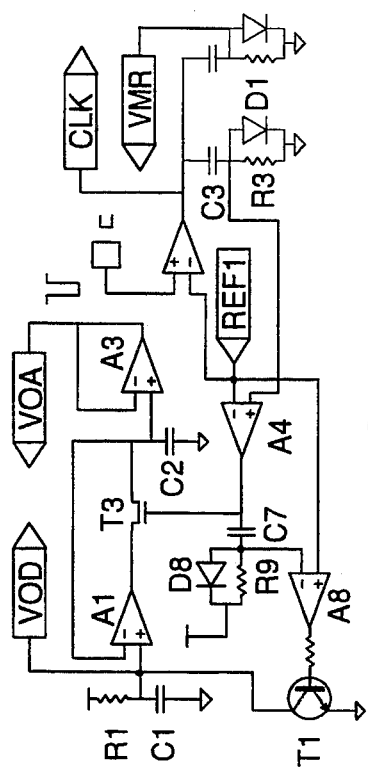
FIG. 4 is a schematic diagram of an alternative circuit to that circuit shown in FIG. 1.

The circuit of FIG. 1 may be replaced by that of the circuit contained in FIG. 4. The difference between the just said 2 circuits is that diode D6 of FIG. 1 is replaced by transistor T3 of FIG. 4 and its associated control circuitry, and a change in the control circuitry of transistor T1 of FIG. 4; all other aspects of operation remain the same, and sections of the circuit which are identical have retained their same identifiers. Newly introduced circuit configurations and elements have been given new identifiers.

Now referring to FIG. 4:

Transistor T3 is a MOSFET. In this invention it is called a Pass Gate Transistor (PGT). When the Gate of the PGT is taken to the power supply voltage it can conduct current in both directions and can be equated to a copper wire connecting 2 nodes in a circuit. When the PGT is on, the voltage present at the output of operational amplifier A1 is placed across the SVC C2. The Gate of the PGT receives a positive voltage pulse, which turns it on, which is called the Pass Gate Turn On Signal (PGTOS), from the output of operational amplifier A4. The PGTOS is generated from the rising edge of the MRS and its duration and construction is dependent on the component values of capacitor C3 and resistor R3. Capacitor C3 and resistor R3 are configured as an Edge to Pulse Conversion Circuit that has positive edge sensitivity. Diode D1 acts to short out to ground potential negative under shoot voltages.

The falling edge of the PGTOS generates a subsequent positive voltage pulse at the output of voltage comparator A8, to be called the Master Discharge Signal (MDS), which turns on transistor T1 and which causes discharge of capacitor C1 to take place. The duration and construction of the MDS is through the use of components resistor R9, capacitor C7 and voltage comparator A8. Diode D8, resistor R9 and capacitor C7 are configured as an Edge to Pulse Conversion Circuit that has negative edge sensitivity and voltage comparator A8 is configured as an inverter. Diode D8 is present to short out over shoot voltage pulses to the voltage power supply. The circuit elements and configuration which causes the discharge of capacitor C1 to take place when the rising edge of the MRS occurs is to be called the Cyclic Discharge Circuit of this circuit configuration.

Now referring to FIG. 3:

Signal CLK drives the common clock line of multiple D-type flip-flops F-1 through F-N. Any number of D-type flip-flops may be used depending on the number of AFA steps that may be desired. The D-type flip-flops through F-N are positive clock edge triggered. The D-type flip-flops on power up have the Q outputs set to a logical level of 0. The voltage of signal VOA is fed to the top of a resistor divider ladder composed of the resistors S-1 through S-N. The voltage that is seen at the inverting inputs of the operational amplifiers O-1 through O-N is dependent on the value of the resistors present in the resistor divider ladder S-1 through S-N as shown. The values of the resistors S-1 through S-N are selected such that they, in conjunction with reference voltage REF 1, cause each of the outputs of the operational amplifiers O-1 through O-N each in their turn to change state when voltage of signal VOA causes the inverting input of the voltage comparator in observation to pass beyond the voltage at the noninverting input. With this circuit configuration each of the outputs of the voltage comparators will transition state as the voltage of signal VOA passes through a unique voltage level specific to that voltage comparator. The triggering point of each of the operational amplifiers is set through the effective resistor divider ladder composed of the total resistance above and below the node at the inverting input of each of the voltage comparators in conjunction with the reference voltage REF1 set at the noninverting input of the operational amplifier.

The outputs of each of the operational amplifiers O-1 through O-N is fed to the D inputs of the corresponding D-type flip-flops F-1 through F-N as is shown. The D-type flip-flops sample and store the outputs of the voltage comparators at the rising edge of the signal CLK. Each of the Q outputs of the D-type flip-flops F-1 through F-N is connected to the Gate of the corresponding MOSFET transistors P-1 through P-N. The Source of each of the transistors P-1 through P-N is connected to ground potential. As each of the respective transistor P-1 through P-N turn on in their turn as a result of the voltage VOA dropping, the portion of VOA that makes up VOC is also caused to drop. The value of VOC in comparison to VOA is what determines the AFA which is to be applied to the firing of the spark plug as is explained later in reference to FIG. 2.

Signal IDL becomes a logic level 1 when the period of the MRS falls below a certain set point which is indicated by a specific voltage level of the signal VOA. The user of the invention may also adjust the value of VOC as a portion of VOA while the invention is in operational use by adjusting the potentiometer RP. This allows the user to change the AFA at which the spark plug fires for a given period of the MRS if the signal IDL is of a logical value of 1. The output VOC is a result of the described circuit configuration called the Step Advance Set Circuit. The described Step Advance Set Circuit changes the effective AFA at which the spark plug is fired in steps as opposed to a continuous smooth function.

Figure 6:
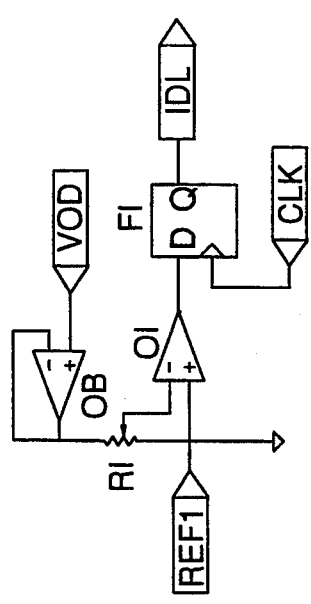
FIG. 6 is a schematic diagram of an alternative idle detection circuit.

The circuit of FIG. 3 of the invention may be replaced with the circuits contained in FIG. 5 and FIG. 6. Now referring to FIG. 5. Voltage VOA through a negative amplification factor is applied to the Gate of transistor T4. The point at which polarity reversal takes place is about the voltage which is at the noninverting input of operational amplifier OG, this voltage is known as a Virtual Ground. The Virtual Ground may be set by the potentiometer RM. In this circuit configuration transistor T4 is used as a voltage controlled resistor. The transfer characteristics of the transistor T4 is such that as the Gate to Source voltage of transistor T4 increases, the current that it is capable of conducting also increases. The effect of this is that transistor T4 may be used as voltage controlled resistor whose resistance drops as the Gate to Source voltage increases.

The voltage at the Gate of transistor T4 increase as the voltage VOA drops and this causes the effective resistance of the transistor T4 to drop which in turn causes the voltage VOC to be a lower fraction of the voltage value of VOA. With this circuit configuration it is possible to have a continuous as opposed to a stepwise relationship between the voltage VOA and VOC. The potentiometer RPB enables the user to change the portion of the voltage VOA that makes up the signal VOC and thus change the AFA that is applied to the firing of the spark plug for a given period of the MRS if the IDL signal is at a logical value of 1. The output VOC is a result of the described circuit configuration called Continuous Advance Set Circuit. The described Continuous Advance Set Circuit changes the effective AFA at which the spark plug is fired in a continuous function as opposed to a step function.

Now referring to FIG. 6:

The voltage VOD is buffered by operational amplifier OB. By use of the potentiometer RI the voltage value of VOD which causes the output of the voltage comparator OI to change state can be set. The output of the D-type flip-flop FI is updated on the rising edge of the signal CLK. If the signal IDL is of a logical value 1 then the period of the MRS is below that of the set value.

Now referring to FIG. 2:

Voltage comparator A2 and its function is called the Spark Plug Firing Time Calculator (SPFTC) The output of SPFTC is called the AFA Signal (AFAS). The rising edge of the AFAS marks the point in time where the spark plug will be fired at if the signal IDL is of a logical value of 1. The time difference between the rising edge of the AFAS and the rising edge of the MRS is the AFA at which the spark plug is fired.

The AFAS is generated by having the voltage VOC feeding the inverting input of the SPFTC. The noninverting input of SPFTC A2 gets fed to it voltage VOD. When voltage VOD goes beyond the voltage of VOC the output of the SPFTC goes to a logical level of 1 indicating that the spark plug should be fired if the signal IDL is at a logical level of 1. The voltage value of VOC is a fraction of the voltage value of VOA.

With this circuit implementation the actual point in time where the spark plug is fired is dependent on the period of the previous cycle and also on the value of the voltage of the signal VOC. The lower the fraction of VOA that VOC is, the higher will be the AFA that will be applied to the firing of the spark plug. The AFAS which is the output of the SPFTC A2 is calculated with each period of the MRS.

If the IDL signal is of a logical value of 1 then it will allow the AFAS from the SPFTC A2 to propagate through the logic gates G1 and G2 and cause the Master Firing Signal (MFS) 4 to have a rising edge occurring which is in advance of the rising edge of the MRS. If the signal IDL is at a logic state of 0 then it will allow the signal VRM to cause a rising edge of the MFS which is coincident with the rising edge of the MRS thus causing no advance to be applied to the firing of the spark plug. The circuitry used to generate the rising edge of the MFS such that it is dependent on the state of the signal IDL is called the Capacitive Discharge Control Circuit.

The rising edge of the MFS 4 is converted to a positive going voltage pulse signal which is called the SCR Firing Signal (SCR-F-S) 5 whose width is controlled by the value of the components capacitor C4 and resistor R4. The width of the SCR-F-S should be such that it assures the firing of the SCR S1. The circuit that generates the SCR-F-S from the rising edge of the MFS is called the Spark Plug Firing Control Logic.

The Oscillator Gate Off Signal (OGOS) 7 is an elongated version of signal SCR-F-S 5. The OGOS is constructed such that it is active for the duration of the SCR-F-S and also for a period of time longer which is dependent on the values of capacitor C5 and resistor R5. The configuration and functionality of diode D7, capacitor C5, and resistor R5 is to be called a Signal Level Extender Circuit. The purpose of OGOS is to turn off the drive to transistor T2. The drive to transistor T2 is to be turned off long enough for all of the energy contained in the capacitive Discharge Capacitor CDC to be dissipated when the SCR S1 is turned on.

A Free Running Oscillator is constructed with the logic gates A6 and A7. The frequency of oscillation is controlled by the values of resistor R6 and capacitor C6. The frequency of the oscillator is chosen such that when transistor T2 is on that a magnetic field is built up in the transformer L1 to the point where saturation of the magnetic field is about to occur. The oscillator drive to the base of transistor T2 is turned off when the OGOS 7 is in the logical 1 state. Also drive to the base of transistor T2 is turned off when the Voltage Achieved Signal (VAS) 6 is at a logical 0 state indicating that the minimum voltage has been achieved across the CDC which is called the Capacitive Discharge Voltage (CDV). The VAS signal has no effect if the OGOS is in the logical 1 state.

Transformer L1 is configured as a voltage step up transformer. Energy is stored in the transformer L1 when the transistor T2 is on. When transistor T2 is turned off the collapse of the magnetic field in the transformer L1 causes a much greater voltage to be built up in the primary coil winding of the transformer L1 and this voltage is passed to the secondary winding output and it is amplified by a factor which is equal to the turns ratio of the primary to secondary windings. The voltage at the secondary winding of a transformer L1 is rectified by the Full Wave Bridge Rectifier B. The output of the Full Wave Bridge Rectifier B is stored on the CDC. The value of the voltage stored across the CDC for any given time period is dependent on the frequency of signal 8 which is the output of the Free Running Oscillator and on the turns ratio of the transformer L1 along with the size of the magnetic field that is stored in the transformer L1. This circuit configuration which places and controls the CDV on the CDC is called the Regulated Supply Voltage Booster. The circuit elements and configuration that causes transistor T2 to turn on and off and also containing transistor T2 is called the Transformer Drive Circuitry.

The signal SCR-F-S 5 turns on the SCR S1. Diode D5 shorts out negative going voltage spikes that result as a turning on of the SCR S1. When SCR S1 turns on it causes the voltage that was stored on the CDC to be applied across the primary winding of the transformer L2. This causes a voltage oscillation to occur and a voltage to appear across the secondary winding of the transformer L2 such that it causes an electrical spark to jump across the electrodes of the spark plug SP. The energy that is dissipated in the firing of the spark plug is dependent on the value of voltage that was present across the CDC and on the capacitance value of the CDC. The firing voltage of the spark plug is dependent on the voltage across the CDC and on the turns ratio of the transformer L2. The firing of the spark plug by means of applying a charged capacitor to the primary of transformer to create a high enough voltage at the secondary of the transformer so that an electrical spark will jump an air gap is known as capacitive discharge firing of a spark plug.

What is claimed is:

1. An electronic ignition device for determining an advanced firing angle for an internal combustion engine having a spark plug and a rotating shaft, comprising:
   (a) a sensor configured to detect when said shaft rotates past top dead center and to provide a master reference signal in response to said detecting;
   (b) a ramp generator that produces a ramp signal, said ramp signal being reset in response to said ramp generator receiving said master reference signal;
   (c) a sample and hold circuit that samples said ramp signal in response to receiving said master reference signal, resulting in a peak signal, said sample and hold circuit providing said peak signal as an output;
   (d) a divider that receives said peak signal, and provides a fraction of said peak signal as an output; and
   (e) a comparator that compares said ramp signal and said output of said divider, and provides a master firing signal to cause said spark plug to fire when said ramp signal exceeds said output of said divider.

2. The electronic ignition device of claim 1, wherein said divider comprises a voltage divider.

3. The electronic ignition device of claim 2, wherein said voltage divider provides a selected fraction out of a plurality of different fractions of said peak signal as an output, said selected fraction being chosen based on said peak signal.

4. The electronic ignition device of claim 3, wherein said voltage divider includes a variable resistor having a resistance controlled by said peak signal.

5. The electronic ignition device of claim 3, wherein said voltage divider includes a transistor configured as a voltage-controlled resistor, said transistor controlled by said peak signal.

6. The electronic ignition device of claim 3, further comprising:
   (e) an idle detector that receives said peak signal and provides an idle signal in response to said peak signal indicating that said shaft is rotating faster than a predetermined speed; and
   (f) a control logic circuit that receives said master firing signal and said idle signal and said master reference signal, and in response to said idle signal being present, providing said master firing signal to cause said spark plug to fire, and in response to said idle signal being present, providing said master reference signal to cause said spark plug to fire.

7. The electronic ignition device of claim 1, further comprising:
   (e) an idle detector that receives said peak signal and provides an idle signal in response to said peak signal indicating that said shaft is rotating faster than a predetermined speed; and
   (f) a control logic circuit that receives said master firing signal and said idle signal and said master reference signal, and in response to said idle signal being present, providing said master firing signal to cause said spark plug to fire, and in response to said idle signal being present, providing said master reference signal to cause said spark plug to fire.

8. An electronic ignition device for determining an advance firing angle for an internal combustion engine that includes a rotating shaft, comprising:
   (a) a sensor configured to detect when said shaft rotates past top dead center and to provide a master reference signal in response to said detecting;
   (b) a ramp generator, responsive to said sensor, that produces a ramp signal, said ramp signal being reset in response to said ramp generator receiving said master reference signal;
   (c) a peak detect circuit that receives said ramp signal from said ramp generator and that captures a peak value of said ramp signal;
   (d) a divider that receives said peak signal, and provides a fraction of said peak signal as an output; and
   (e) a comparator that compares said ramp signal and said output of said divider, and provides a master firing signal to cause said spark plug to fire when said ramp signal exceeds said output of said divider.

9. The electronic ignition device of claim 8, wherein said divider comprises a voltage divider.

10. The electronic ignition device of claim 9, wherein said voltage divider provides a selected fraction out of a plurality of different fractions of said peak signal as an output, said selected fraction being chosen based on said peak signal.

11. The electronic ignition device of claim 10, wherein said voltage divider includes a variable resistor having a resistance controlled by said peak signal.

12. The electronic ignition device of claim 10, wherein said voltage divider includes a transistor configured as a voltage-controlled resistor, said transistor controlled by said peak signal.

13. The electronic ignition device of claim 10, further comprising:
   (e) an idle detector that receives said peak signal and provides an idle signal in response to said peak signal indicating that said shaft is rotating faster than a predetermined speed; and
   (f) a control logic circuit that receives said master firing signal and said idle signal and said master reference signal, and in response to said idle signal being present, providing said master firing signal to cause said spark plug to fire, and in response to said idle signal being present, providing said master reference signal to cause said spark plug to fire.

14. The electronic ignition device of claim 8, further comprising:
   (e) an idle detector that receives said peak signal and provides an idle signal in response to said peak signal indicating that said shaft is rotating faster than a predetermined speed; and
   (f) a control logic circuit that receives said master firing signal and said idle signal and said master reference signal, and in response to said idle signal being present, providing said master firing signal to cause said spark plug to fire, and in response to said idle signal being present, providing said master reference signal to cause said spark plug to fire.

15. A method for determining an advanced firing angle for an internal combustion engine having a spark plug and a rotating shaft, the method comprising the steps of:
   (a) sensing when said shaft rotates past top dead center and providing a master reference signal in response to said sensing;
   (b) generating a ramp signal;
   (c) capturing said ramp signal in response to said master reference signal and providing said captured ramp signal as a peak signal;
   (d) resetting said ramp signal in response to said master reference signal;
   (e) dividing said peak signal and providing said result as a fractional signal;
   (f) comparing said ramp signal and said fractional signal, and providing a master firing signal when said ramp signal exceeds said fractional signal; and
   (g) firing said spark plug in response to said master firing signal.

16. The method of claim 15, wherein said step of dividing includes dividing said peak signal by a selected denominator out of a plurality of selected denominators, said selected denominator being chosen based on said peak signal.

17. The method of claim 16, further including the steps of:
   (h) detecting when said peak signal indicates that said shaft is rotating faster than a predetermined speed and providing an idle signal in response to said detecting; and
   (i) in response to said idle signal being present, firing said spark plug in response to said master firing signal, and in response to said idle signal being absent, firing said spark plug in response to said master reference signal.

18. The method of claim 15, further including the steps of:
   (h) detecting when said peak signal indicates that said shaft is rotating faster than a predetermined speed and providing an idle signal in response to said detecting; and
   (i) in response to said idle signal being present, firing said spark plug in response to said master firing signal, and in response to said idle signal being absent, firing said spark plug in response to said master reference signal.

* * * * *